(12) United States Patent
Nivens et al.

(10) Patent No.: US 6,430,418 B1
(45) Date of Patent: Aug. 6, 2002

(54) METHOD AND SYSTEM FOR CONTROLLING UPLINK POWER IN A SATELLITE COMMUNICATION SYSTEM USING ERROR LEVELING

(75) Inventors: Dennis A. Nivens; David A. Wright, both of Hermosa Beach; Michael S. Munoz, Redondo Beach; Gregory S. Caso, Hermosa Beach, all of CA (US); Scott A. Stephens, Phoenix, AZ (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/596,344

(22) Filed: Jun. 19, 2000

(51) Int. Cl.[7] .............................. H04B 7/00; H04Q 7/20
(52) U.S. Cl. .................. 455/522; 455/69; 455/12.1; 455/427; 370/321; 370/326
(58) Field of Search ........................... 455/69, 70, 522, 455/12.1, 427; 370/318, 319, 326, 321

(56) References Cited

U.S. PATENT DOCUMENTS

| | | | |
|---|---|---|---|
| 4,910,792 A | | 3/1990 | Takahata et al. |
| 5,307,512 A | * | 4/1994 | Mitzlaff ....................... 455/126 |
| 5,752,166 A | * | 5/1998 | Dorenbosch ............... 455/67.1 |
| 5,768,684 A | * | 6/1998 | Grubb ........................ 455/13.4 |
| 5,864,547 A | | 1/1999 | Strodtbeck et al. |
| 6,085,067 A | * | 7/2000 | Gallagher .................. 455/13.1 |
| 6,147,981 A | * | 11/2000 | Prescott ...................... 370/318 |
| 6,185,432 B1 | * | 2/2001 | Vembu ........................ 455/522 |

* cited by examiner

*Primary Examiner*—Vivian Chin
*Assistant Examiner*—James K Moore
(74) *Attorney, Agent, or Firm*—McAndrews, Held & Malloy, Ltd.

(57) ABSTRACT

A method and system for controlling uplink power in a satellite communication system using error leveling is provided. The uplink power control system for a satellite communication system of a preferred embodiment of the present invention comprises a communication satellite (101) and at least one UET (105). The communication satellite (101) includes an error detector (211) and a comparator (215). The UET (105) includes a receiver (206) for receiving an error indicator signal from the comparator (215), and a power profile processor (216) for controlling the transmit power level of the particular chanslot being used by the UET in response to the error indicator. A preferred method for controlling the transmit power level of a particular chanslot assigned to a UET in a satellite communication system in accordance with the present invention includes determining an error count for an uplink data signal received from the UET in the chanslot (403), and comparing the error count to a predetermined error threshold (404). The method further includes generating an error indicator signal for the chanslot in response to the comparison (405), and controlling the transmit power level of the particular chanslot in response to the error indicator (409, 410).

23 Claims, 4 Drawing Sheets

METHOD AND SYSTEM FOR CONTROLLING UPLINK POWER IN A SATELLITE COMMUNICATION SYSTEM USING ERROR LEVELING

BACKGROUND OF THE INVENTION

The present invention generally relates to satellite communication systems. In particular, the present invention relates to controlling the uplink power in a satellite communication system.

Satellites have long been used to provide communication services to large regions of the globe. Historically, communication satellites have used frequencies in the range—of 3 to 12 GHz (C or Ku band) to produce an antenna beam which covers a large portion of a continent. Modern satellites may operate at frequencies of 20 to 30 GHz (Ka band) to produce a beam which may cover an area (or "cell") with a diameter of 300 to 400 miles. Many such cells may be needed to provide communications to a region which previously may have been serviced by a single antenna beam. A modern cellular communication satellite may employ many antennas to generate a large number of beams used for transmitting downlink signals to, and receiving uplink signals from, various User Earth Terminals (UET) distributed over the surface of the earth.

In order for communication to occur on the uplink, signals generated by the UET must be of sufficient power to be received by the satellite. Thus, the antenna gain of the satellite's uplink antenna coupled with the transmission power of the UETs must be sufficient to allow communication to occur. Typically, communication satellite systems are designed with a predetermined, fixed satellite uplink antenna gain. Thus, the transmission power of the UET is typically controlled to enable and ensure communication.

In practice, several factors exists which may negatively impact the uplink communication channel. That is, certain undesired influences may cause the actual antenna gain to vary from the predetermined, designed antenna gain or may cause attenuation of, or interference with, a signal transmitted by a UET. For example, antenna gain may be affected by gain roll-off which may cause the antenna gain to vary spatially over the cell or, alternatively, antenna gain may vary over the cell as a result of pointing errors in the antenna. Atmospheric attenuation, also known as "rain loss," or interference among several UETs, also known as Co-Channel Interference (CCI), may also affect the quality of a signal transmitted from a UET. Each of these conditions, gain roll-off, antenna pointing errors, atmospheric attenuation, and CCI is further discussed below.

1) Gain Roll-Off

The pattern of cells on the surface of the earth is known as the cellular pattern of the satellite communication system. The cellular pattern in a modern satellite communication system may be defined on the surface of the earth such that the maximum gain of a satellite antenna beam is directed toward the center of its assigned cell. The boresight of a satellite antenna beam may be defined as the maximum gain point in the satellite antenna beam, and is typically directed to the center of a cell. The edge of a cell may be defined by determining the angular deviation from the antenna boresight at which the gain of the antenna beam drops to a predetermined value below the maximum gain value, typically at least 3 dB below the maximum gain value. The decrease in antenna beam gain with increasing angular deviation from boresight is known as gain roll-off. In terms of uplink power, a communications signal which is transmitted to the satellite from a UET located at the edge of a cell may be received by the satellite antenna with a gain which is at least 3 dB lower than the gain of a signal which is transmitted from a UET located at the antenna boresight, or center of the cell. Thus, the transmission power level of a terminal located at the edge of a cell must be at least 3 dB higher than that of a terminal located at the center of a cell in order to achieve the same level of performance. In other words, if the edge of a cell is defined as the angle from boresight at which the satellite antenna gain has decayed to 3 dB below the maximum antenna gain at the boresight, a UET at the edge of the cell may need to use a transmission power level 3 dB higher than a UET at the center of the cell in order to compensate for the reduced antenna gain at the edge of the cell. By transmitting at the 3 dB higher transmission power level, the signal from the UET at the edge of the cell may be received at the satellite with a power that is approximately equal to the power of a signal from the UET at the center of the cell. In order to simplify and reduce the cost of uplink components installed on the satellite, it is desirable to maintain a similar received power level for each UET in the cell. Thus, it is desirable to modify the transmission power of each UET in the cell to compensate for any reduction in the antenna gain at each UET resulting from the UET's position within the cell.

2) Antenna Pointing Errors

In practice, the antenna beams of a cellular communication satellite are generally not directed precisely toward the centers of their assigned cells. Slight mis-orientations of the antenna boresights and deviations from a perfectly circular, zero-inclination satellite orbit give rise to pointing errors. These pointing errors may cause the location of the maximum gain of an antenna beam to deviate from the cell center. Some pointing errors may also cause the maximum gain of an antenna beam pattern to change measurably over the course of a day. In other words, the antenna beam gain distribution across the cell may change with time.

The antenna beam gain at the edge of a cell typically rolls off rapidly as the distance from the center of the cell increases, that is, as the angular deviation from boresight increases. Thus, a pointing error corresponding to only 10% of a cell diameter may cause the antenna beam gain at the edge of a cell to vary by 2 dB or more. Because it is desirable to maintain a similar received power for each UET in the cell, it is desirable to adjust the transmission power of each UET in the cell to compensate for antenna beam pointing errors.

3) Atmospheric Attenuation

Achieving satisfactory communication performance for a signal transmitted from a UET to a satellite generally depends upon receiving a requisite level of signal power at the satellite. That is, each user terminal must transmit a signal with sufficient power to be received. The relationship between the power of the signal transmitted by the terminal and the power of the signal received by the satellite receiver depends in part upon the amount of attenuation of the signal as it passes through the earth's atmosphere. At Ka-band frequencies, the amount of atmospheric attenuation varies considerably as meteorological parameters and weather patterns change. In particular, the occurrence of rain has a pronounced effect on the attenuation of a Ka-band communication signal. The attenuation of the communication signal is known as rain loss or rain fade, although other meteorological phenomena may also provide attenuation. Such atmospheric conditions and/or weather patterns may change rapidly and may vary among different UETs in a cell depending upon the UET's position within the cell. Because it is desirable to maintain a similar received power for each UET in the cell, it is desirable to adjust the transmission power of each UET in the cell to compensate for the attenuation experienced by the UET's signal due to rain loss.

4) Co-Channel Interference

Immediately adjacent cells in a cellular satellite communication system typically use different frequencies for transmitting signals. However, non-adjacent cells may use the same frequency. Such frequency re-use among cells within a cellular pattern serves to reduce the overall frequency bandwidth necessary for the satellite communication system. However, imperfections in satellite antenna beams such as, for example, sidelobe generation, may cause signals transmitted from a UET located in a first cell to be received by a satellite antenna beam which is assigned to receive signals from UETs located in a second cell which uses the same frequency as the first cell. Signals transmitted by UETs located in different cells but using the same frequency may thus interfere with each other, and may cause degraded communication performance. That is, a desired signal received by the satellite from a first UET may be interfered-with by signals from other UETs in other cells using the same frequency as the first UET. The interference from the other UETs may interfere with the desired signal and may adversely affect the performance of the communication system. The interference from other UETs is often referred to as Co-Channel Interference (CCI).

The ratio of the signal power received from the desired UET to the background noise is known as the signal-to-background ratio (SBR). The number of errors in a data signal received from a UET at a satellite (i.e., the error count) may be impacted by the SBR. The background noise may include thermal and other noise sources as well as interference sources such as interference from other UETs using the same frequency. In order for the satellite to receive a signal from a particular UET, the transmission power of the UET must be sufficient to provide at least a certain desired minimum SBR. As the background portion of the SBR increases with increasing CCI, the signal portion of the SBR is also increased to maintain the desired SBR. That is, the UET of interest transmits with increased transmission power to maintain the desired SBR in light of the increasing interference from other UETs. However, increasing the transmission power of the UET of interest raises the background level for the other UETs. The other UETs, also seeking to maintain the desired SBR, in turn respond by raising their transmission powers. The UET of interest may react by further increasing its power, and so on until all terminals in the system are operating at the maximum transmission power. This phenomenon is known as system runaway.

Satellite systems have been proposed that attempt to address the problem of system runaway by establishing a single, constant transmission power level for each UET. These proposed systems contemplated using frequencies in the range of 3 to 12 GHz (C or Ku band). Maintaining a constant power for each UET may be acceptable at Ku or C band frequencies in some cases. However, at higher, Ka-band frequencies (20–30 GHz), for example, attenuation alone may cause the power of the received signals at the satellite to vary over a range of 20 dB or more. A comparable dynamic range would be required of the satellite demodulator, which would have a dramatic impact on system complexity and cost. Additionally, such a system would produce a high degree of CCI and increased power consumption. Because of the high CCI, the maximum tolerable interference level from other UETs would unduly limit the number of UETs that may be used, and system capacity would be needlessly limited. Therefore, it is desirable to maintain satisfactory communication performance (typically, maintain a desired SBR and/or a desired error count) while preventing system runaway.

Additional complexity arises in an uplink power control system with regard to UETs which transmit data intermittently rather than continuously, or whenever a UET first establishes a communication channel for transmission to the satellite. When a UET initiates a transmission, the UET may be forced to send an uplink signal into an attenuation and interference environment substantially unknown to the UET. That is, the UET may not be able to transmit initially with a transmission power that provides the desired SBR while not providing needless CCI to other UETs using the same frequency. If the initial transmission power is set too low, the signal may not be received by the satellite. If the initial transmission power is set too high, it may add a disproportionate amount of CCI and degrade the quality (adversely impact the SNR) of other uplink signals in the system.

U.S. Pat. No. 4,910,792, entitled "Up-link Power Control in Satellite Communications System" (the '792 patent) illustrates one approach for controlling uplink transmission power to compensate for rain attenuation. The '792 patent illustrates a system including a number of user stations 59, a reference earth station 58, and a satellite 50, identified at column 1, lines 41–43, which is "a mere repeater of signals, but has no facility to measure the power transmitted from each earth station." In operation, the transmission power of a reference signal transmitted from the reference earth station 58 is adjusted so that the received reference signal at the satellite is constant. Each user station 59 transmits a signal which is relayed to the satellite and back to the user station 59. Each of the earth stations 59 then detects the difference between the received reference signal from the reference earth station through the satellite and the level of the received signal with was sent from itself and relayed by the satellite. Each of the earth stations 59 then adjusts its uplink power based on the difference between the signals. That is, the '792 patent assumes that the reference burst 60 from the reference station 59 is received by the user station 59 with attenuation only on the downlink, while the burst 61 sent from the user station 59 is received at the user station 59 with the attenuation on both the uplink and downlink. Therefore, the difference between the received reference burst signal 60, and the user station burst 61 sent from the user station itself is the attenuation 62 in the uplink, as shown in FIG. 4(b). The system of the '792 patent applies only to systems employing "bent pipe" transponders, which are not present in a processing satellite communication system.

U.S. Pat. No. 5,864,547, entitled "Method and System for Controlling Uplink Power in a High Data Rate Satellite Communication System Employing On-Board Demodulation and Remodulation" (the '547 patent) illustrates another approach for controlling uplink transmission power. In operation, as shown in FIGS. 1 and 5, a downlink error rate of the data in a downlink data stream is determined based on known data bits transmitted by a satellite and received by a receiving terminal 12. An end-to-end error rate of the uplink data stream and the downlink data stream is then determined based on the number of errors in received data transmitted by a first user terminal 11 to the receiving terminal 12. The error rate of the uplink is then indirectly estimated based on the downlink error rate and the end-to-end error rate with reference to a lookup table. Finally, the power of the uplink is controlled based on the indirect estimate of error rate of the uplink. Thus, the '547 patent relies on an indirect estimate of uplink signal quality using downlink signals. Therefore, errors introduced in the downlink may not be reliably separable from errors introduced in the uplink. The '547 patent does not determine the uplink error rate directly.

Thus, a need has long existed for a system and method for controlling the uplink power in a satellite communication system. A need has especially existed for such a system and method able to control uplink power in an uplink channel affected by gain roll-off, antenna pointing errors, atmospheric attenuation, and CCI. Additionally, a need has long existed for such a system and method to control initial uplink transmission power. Finally, a need has long existed for a system able to measure an uplink power level or data error rate directly.

SUMMARY OF THE INVENTION

A method and system for controlling uplink power in a satellite communication system using error leveling is provided. The uplink power control system for a satellite communication system of a preferred embodiment of the present invention generally comprises a communication satellite and at least one user terminal. The communication satellite may include an error detector for determining the error count in a received data signal transmitted from a user earth terminal (UET) to the communication satellite using a particular channel. The communication satellite may also include a comparator for generating an error indicator signal in response to a comparison of the error count to a predetermined error threshold. The UETs generally include a receiver for receiving the error indicator signal from the comparator, and a controller for controlling the transmit power level of the particular channel being used by the UET in response to the error indicator signal.

The method for controlling the transmit power level of a particular channel assigned to a UET in a satellite communication system of a preferred embodiment of the present invention includes the steps of transmitting an uplink data signal using the channel from the UET to a satellite, receiving the data signal in the particular channel at the satellite, determining an error count for the uplink data signal in the channel using the data signal received from the UET, and comparing the error count to a predetermined error threshold. The method of the present invention may further include generating an error indicator signal for the channel in response to the comparing step, transmitting the error indicator signal to the UET, receiving the error indicator signal at the UET, and controlling the transmit power level of the particular channel in response to the error indicator signal.

The present invention may comprise an individual component of a comprehensive power control system, such as that described in U.S. patent application Ser. No. 09/596,683 (TRW 22-0107), filed Jun. 19, 2000, entitled "Comprehensive System and Method for Uplink Power Control in a Satellite Communication System".

DETAILED DESCRIPTION OF THE PREFERRED EMBODIMENTS

Figure 1:
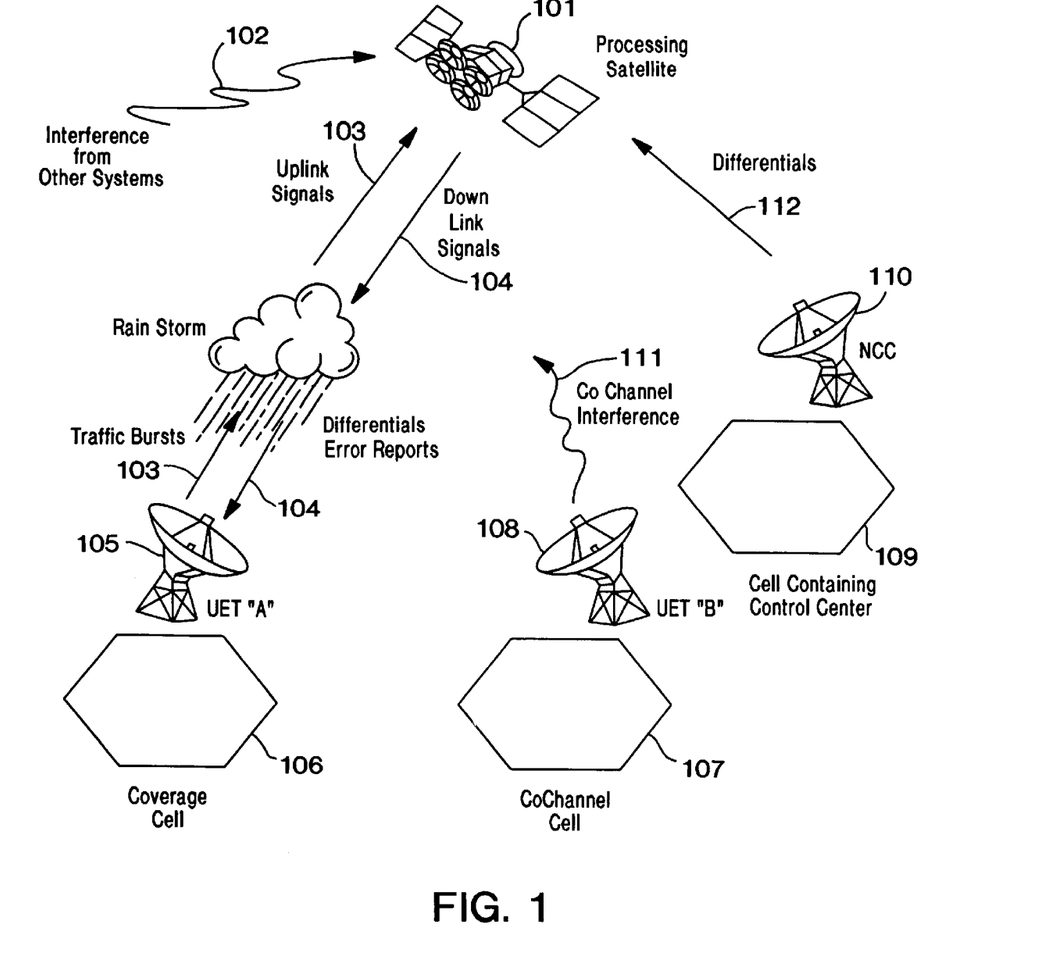
FIG. 1 illustrates a satellite communication system according to a preferred embodiment of the present invention.

A preferred embodiment of the present invention provides a method and system for controlling uplink power in a satellite communication system using error leveling. FIG. 1 illustrates an exemplary satellite communication system 100 within which the present method and system for error leveling of uplink power may be implemented. The satellite communication system 100 comprises a processing satellite 101 which includes a satellite-mounted error leveling module (e.g., 201 in FIG. 2), a network control center (NCC) 110, and one or more user earth terminals (UETs) 105, 108 located in one or more respective coverage cells 106, 107. Each of the UETs 105, 108 includes a UET-mounted error leveling module (e.g., 202 in FIG. 2). Although exemplary FIG. 1 illustrates a multibeam satellite 101, the system may use a single-beam satellite.

In the satellite communication system 100 of FIG. 1, it is generally desired that the uplink data signal 103 from a transmitting UET 105 to the processing satellite 101 maintain a predetermined level of signal fidelity. Various types of signal fidelity criteria may be applied, such as, for example, the error count (or error rate) or the signal-to-noise ratio (SNR). One preferred signal fidelity criterion is error count or rate.

The error rate is the number of errors per data bit detected by the satellite's error detecting decoder (e.g., 211 in FIG. 2), and the error count is the actual number of errors detected in a particular data signal. The error count (and error rate) is generally a function of the UET's transmit power level. The transmit power level refers to the power level at which the UET's uplink transmitter sends an uplink data signal. The transmit power level represents the power of the uplink data signal before the signal is amplified by a high power amplifier (HPA) (e.g., the uplink data signal "X" (226) in FIG. 2). However, the transmit power level may alternatively refer to the power level of the uplink data signal at any point in the transmission of the signal (e.g., 222 or 230 in FIG. 2).

In order to maintain the error count at a predetermined threshold level, it is desirable for the UET's 105 transmit power level to be sufficiently high to satisfy the error threshold. The error threshold is a predetermined level of signal fidelity and more specifically, it is a predetermined error count. At the same time, the transmit power level is ideally no greater than required. This is primarily because the excess power may increase the amount of co-channel interference experienced by other UETs 108. It is therefore desirable to maintain the error rate for every channel on which the UET 105 is authorized to communicate, at a level that is near the error threshold. In a preferred embodiment, the error threshold may be slightly higher than the theoretical minimum in order to accommodate the inevitable wander in a closed loop tracking procedure.

The satellite communication system preferably uses frequency division multiple access (FDMA) in combination with time division multiple access (TDMA) for allocating available communication resources, such that each terminal within a given cell is assigned a frequency channel and one or more time slots for transmission of uplink signals. Terminals located in adjacent cells transmit uplink signals using different frequency channels, while terminals in nonadjacent cells may use the same frequency channels. For example, the UET "A" 105 may use the same frequency channel as the UET "B" 108 for transmitting uplink signals to the satellite 101. Each channel/slot combination ("chanslot") is assigned to only one terminal in a given cell for transmission of uplink signals, while each terminal may be assigned one or more chanslots. Alternatively, the present invention may be implemented in many other types of satellite communication systems, including systems using code division multiple access (CDMA), only FDMA, only TDMA or any other combination of CDMA, FDMA and/or TDMA. A preferred embodiment of the present invention is described in detail below in the context of an FDMA/TDMA system.

As seen in FIG. 1, a UET 105 sends uplink data signals 103 to the processing satellite 101 The error rate of the uplink data signals 103 may be affected by a variety of different factors including, but not limited to, the transmit power level from the transmitting UET 105, co-channel interference (CCI) from other UETs 108 using the same frequency (these other UETs 108 may communicate within the processing satellite system 100 or in adjacent satellite systems), attenuation due to current weather conditions (e.g., precipitation), or gain change due to mispointing of the satellite 101 and/or the antenna of the UET 105.

The satellite 101 receives and processes the uplink data signals 103 transmitted by the UET 105. As explained in further detail below, in processing the uplink data signal 103 sent in a particular chanslot, an error detecting decoder (e.g., 211 of FIG. 2) at the satellite 101 determines the number of errors that occurred in the uplink data signal, and corrects those errors. The comparator (e.g., 215 of FIG. 2) at the satellite compares the detected number of errors in that uplink data signal to the error threshold, and then generates an error indicator that applies to that chanslot. The satellite then transmits the error indicator to the UET 105 on a downlink 104 (in the same beam as the associated uplink). Based on the error indicator corresponding to the particular chanslot, the UET 105 that is communicating in this chanslot may then adjust its transmit power level for the next uplink data signal which the UET 105 transmits in that chanslot. This error-leveling process generally occurs independently for each chanslot being used by the subject UET 105, as well as for every other UET in the same cell coverage area 106. Generally, all of the error indicators corresponding to every frequency channel in the current time slot (i.e., chanslot) and in the current frame, are transmitted together on the downlink in a comprehensive error data signal referred to as an error report.

Figure 2:
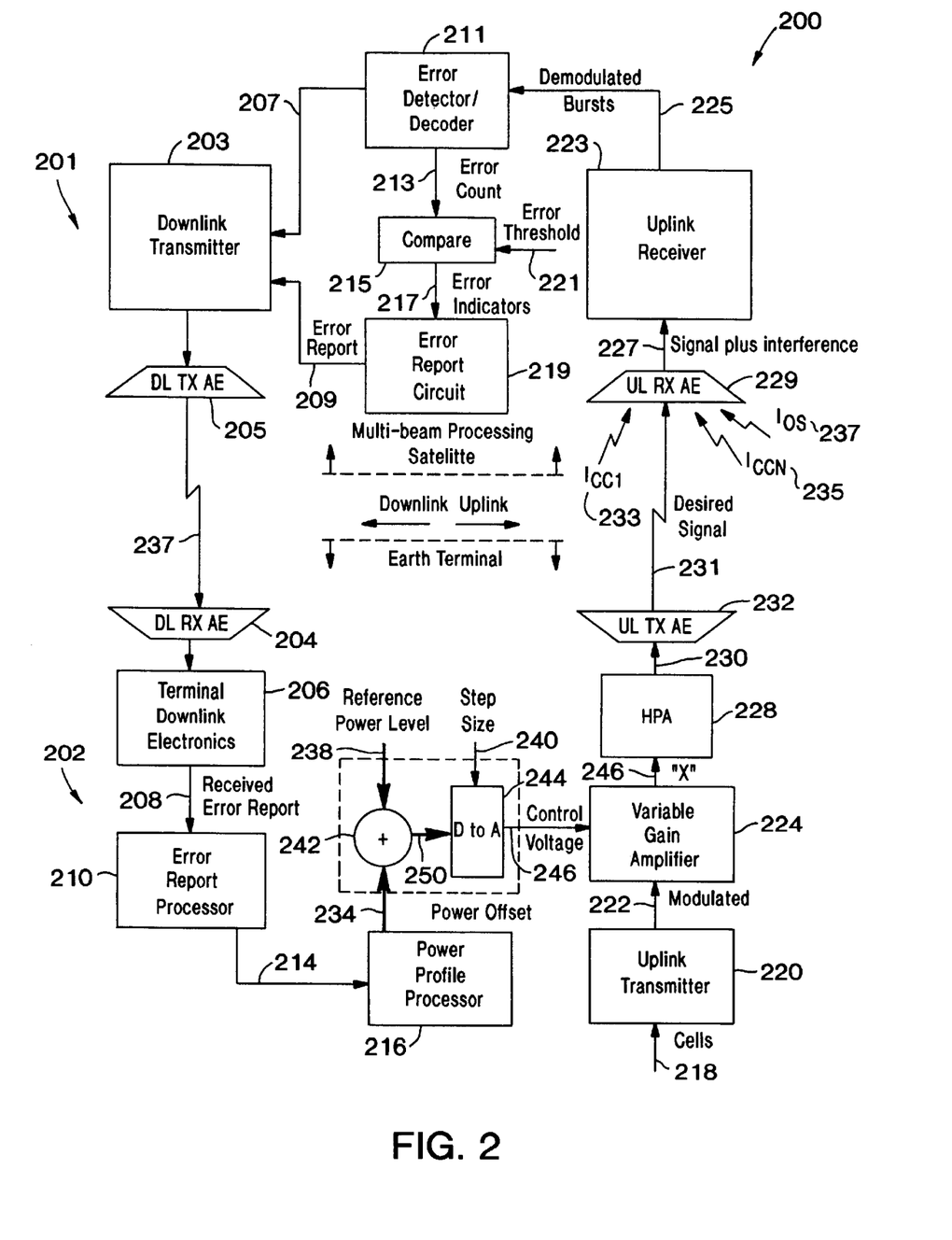
FIG. 2 illustrates a system block diagram of the error leveling control scheme according to a preferred embodiment of the present invention.

FIG. 2 shows a system block diagram of a preferred embodiment of an error leveling control scheme 200 of the present invention. The error leveling control scheme 200 includes a satellite-mounted error leveling module 201 and a UET-mounted error leveling module 202. The satellite-mounted error leveling module 201 comprises an uplink receive antenna 229, an uplink receiver 223, an error detector/decoder 211, a comparator 215, an error report circuit 219, a downlink transmitter 203, and a downlink transmit antenna 205. The UET-mounted error leveling module 202 comprises a downlink receive antenna 204, a downlink receiver 206, an error report processor 210, a power profile processor 216, a power mixer 242, a digital-to-analog (D-to-A) converter 244, an uplink transmitter 220, a variable gain amplifier 224, a high power amplifier (HPA) 228, and an uplink transmit antenna 232.

As shown in FIG. 2, the error leveling control scheme 200 incorporates a closed loop signal path ("error leveling loop"). By way of example, the closed loop "begins" in the UET-mounted error leveling module 202 where a data signal such as, for example, an ATM traffic cell 218, enters the UET's uplink transmitter 220. The uplink transmitter is a standard uplink transmitter 220 which generally modulates the signal desired to be transmitted and performs an initial amplification of the signal. The modulated signal 222 is then further amplified by a standard variable gain amplifier (VGA) 224. As explained further below, the gain applied by the VGA 224 is determined by the control voltage 246. The control voltage 246 is based on the power offset 234 for the particular chanslot (which, as explained below, is based on an error indicator), the reference power level 238, and a predetermined step size 240.

Because satellite communication systems often experience a great amount of attenuation due to various factors including, but not limited to, unfavorable atmospheric conditions, satellite antenna gain roll off, interference, or mispointing of the satellite and/or the UET antenna, it is often necessary to further amplify the uplink data signal with a high power amplifier (HPA) 228. A HPA 228 generally has a rated power level which is several decibels above the minimum value needed to sustain satisfactory uplink performance. After this final amplification by the HPA 228, the modulated and amplified uplink data signal 231 is radiated upward to the satellite via the uplink transmit antenna 232, at an appropriate power level. It is understood that various methods exist for adjusting the uplink transmission power of a UET, and the present invention is not limited to the specific implementation described herein.

It should be noted that the initial transmit power level of the uplink data signal, "X" (226) (i.e., before the error-leveling loop has completed its first loop), is a predetermined value, which is generally equal to the reference power level 238. This is due to the fact that the initial power offset 234 for any given chanslot, before the error leveling loop has been applied for the first time during a transmission, is generally equal to zero. The reference power level 238 may be, for example, a fixed value stored in memory, or it may be determined via an independent "power leveling loop" of the communication satellite system. The power leveling process that determines, and thereafter maintains, the reference power level 238, is described in detail in a co-pending application entitled "Method And System For Controlling Uplink Power In A Satellite Communication System Using Power Leveling," Ser. No. 09/596,671, filed on Jun. 19, 2000, which is incorporated herein by reference.

The uplink data signal 231, which is then received by the satellite's uplink receiver antenna 229, generally includes undesired background components including, for example, interference (either intrasystem (e.g., cochannel) interference or intersystem interference from uplinks to other satellites). The uplink data signal 231 is then processed and demodulated by a standard uplink receiver 223. The processing and demodulation of the uplink data signal 231 is generally done in parallel with many other data signals 233, 235, 237 using different chanslots (i.e., signals that are concurrent in time but occupy different frequency channels). As these uplink data signals 231, 233, 235, 237 complete the demodulation process, the demodulated signals 225 are passed to an error detection decoder 211. This error detection decoder 211 (for example, a standard Reed-Solomon decoder) generally removes all errors, and determines the number of errors that were found and corrected by the decoder 211 for each uplink data signal 231, 233, 235, 237. The decoded data signals 207 are then resolved into their constituent downlink signals (e.g., individual ATM cells), and the constituent downlink signals are passed to the satellite's downlink transmitter 203 for transmission on the downlink to their appropriate destinations.

The error count 213 (i.e., the number of errors) determined by the decoder 211 for each of the uplink data signals 231, 233, 235, 237 is passed to a comparator 215. The comparator 215 compares the individual error count for each data signal 231, 233, 235, 237 to an error threshold 221. The error threshold 221 is generally a predetermined, fixed value in the satellite's memory. The error threshold (T) may be any integer value, 0 through t, inclusive, where t is the maximum number of correctable errors for the decoder 211.

Based on the comparison between the error threshold and the error count for each data signal, the comparator 215 outputs one or more 1-bit error indicators 217 to the error report circuit 219. Each individual error indicator corresponds to a given chanslot (specifically, the chanslot in which the corresponding signal was received by the satellite), and indicates whether the error count for that corresponding chanslot is greater than the error threshold or not. For example, if the error count for a given chanslot is greater than the error threshold, the error indicator for that particular chanslot may be "1", indicating that the error count is above the error threshold. Similarly, if the error count for the particular chanslot is less than or equal to the error threshold, the error indicator for that particular chanslot may be equal to "0", indicating that the error count is not above the error threshold. It is noted that this 1/0 convention corresponding respectively to the "above/not above" indications may be reversed. It is further noted that a more complex comparison indicator 217 may be applied in accordance with the present invention. For example, a 3-bit indicator may be used with the example conventions indicated in Table 1 below.

TABLE 1

| INDICATOR | TRANSLATION |
|---|---|
| 000 | C = T |
| 001 | T < C ≦ 1.03(T) |
| 010 | 1.03(T) < C ≦ 1.06(T) |
| 011 | 1.06(T) < C |
| 100 | T > C ≧ 0.97(T) |
| 101 | 0.97(T) > C ≧ 0.94(T) |
| 110 | 0.94(T) > C ≧ 0.91(T) |
| 111 | 0.91(T) > C |

*Note:
C = error count
T = error threshold

The error report circuit 219 prepares an error report signal 209 which is sent to the downlink transmitter 203. As explained further below with respect to FIG. 3, the error report 209 is generally a single, comprehensive signal that contains the "above/not above" error indicator information corresponding to each of the individual chanslots in a particular frame. Typically, there are 9100 chanslots per frame to be concurrently reported via the error report 209. These chanslots may comprise 175 frequency channels and 52 time slots. The 9100 corresponding error indicators 217 may be packed into a single signal such as, for example (and as specifically described with respect to FIG. 3), a set of ATM error report cells.

Figure 3:
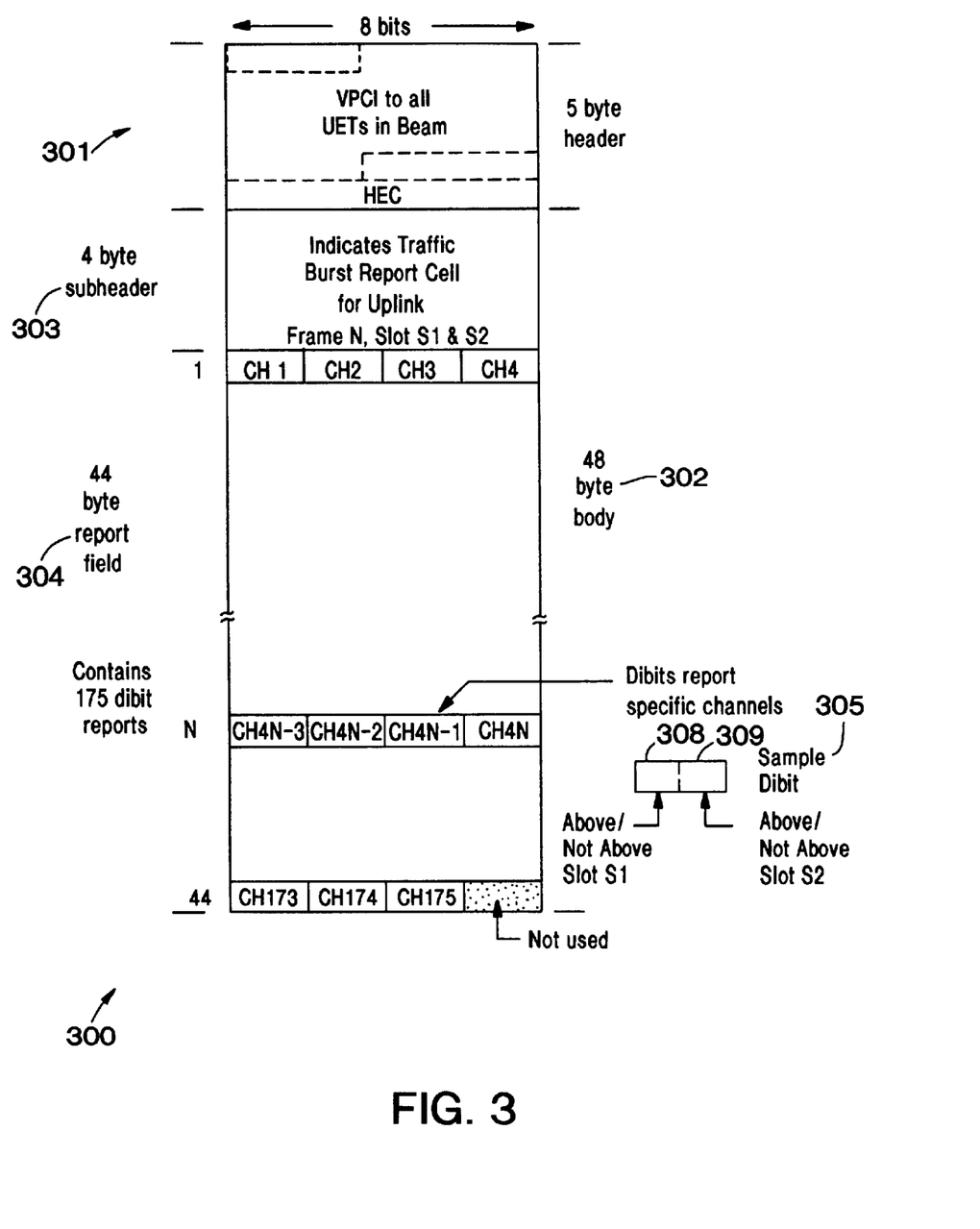
FIG. 3 illustrates the structure of an error report ATM cell according to a preferred embodiment of the present invention.

The error report 209 generated by the error report circuit 219 then enters the downlink 237 (for the same beam as for the associated uplink) via a standard downlink transmitter 203 and a standard downlink transmit antenna 205. The addressing of this error report, as described with respect to FIG. 3, is such that every terminal in the cell coverage area of the beam receives the error report (which includes the uplink frame number and slot number to which the error report pertains) via a standard downlink receive antenna 204 and a standard downlink receiver 206. The received error report 208 is then parsed by an error report processor 210.

As explained in detail with respect to FIG. 3, the error report processor 210 extracts the uplink frame number and time slot numbers to which the received error report 209 pertains to determine if the UET transmitted a data signal in this frame/slot number. If the terminal did transmit in a frame/slot number indicated in the received error report 208, then the error report processor 210 proceeds to extract the particular "above/not above" indicator bits from the received error report 208 that are associated with the chanslot on which the particular UET transmitted an uplink data signal.

The error report processor 210 then sends the associated above/not above error indicator bits to a power profile processor 216. The power profile processor 216 maintains a data set of current power level offsets for each chanslot in use by the UET. These power level offsets are generally integer values, and they describe the gain difference (in units of "step size") relative to the reference power determined via the power leveling procedure mentioned above (and described in detail in a co-pending application entitled "Method And System For Controlling Uplink Power In A Satellite Communication System Using Power Leveling," Ser. No. 09/596,671, filed on Jun. 19, 2000, incorporated herein by reference).

For example, if the current reference power level for the particular UET is 10 dB, and the power offset for the present chanslot is +2 dB, this means that the current power level for this particular chanslot is 2 dB above the reference level, or 12 dB. If the error indicator is 1, thus indicating that the error rate at the satellite is greater than the error threshold, then the power level is too low, thus resulting in a greater number of errors than desired. Therefore, the power profile processor 216 should update the power offset for this chanslot by a predetermined step amount to an appropriate level. For simplicity, it is assumed that an error indicator of 1 results in a +1 dB change in power offset, and an error indicator of 0 results in a −1 dB change in power offset. Thus, for this example, the power profile processor 216 would update its power profile so that the power offset for this particular chanslot is increased to +3 dB. A similar operation is performed for any other chanslot in use by the UET.

Once the power profile is updated as explained above, the updated power profile 234 is sent to a power mixer 242. The power mixer 242 determines the new transmit power level for a particular chanslot by mixing that chanslot's power offset from the updated power profile 234, with the reference power level 238. The power mixer 242 then outputs the new power level output 250 to a digital to analog converter, which generates a control voltage 246, and sends the control voltage 246 to the VGA 224. The UET is now ready to transmit the next data signal (or cell) at the appropriate transmit power level, and the closed error loop of FIG. 2 repeats.

It is noted that the +1 dB increase in the transmit power level of the example above may or may not be sufficient to restore the error count of the chanslot to the requisite error threshold level. Generally, the error leveling process of a preferred embodiment of the present invention is continually functioning and thus continually setting the transmit power level of the modulated signal 222 before it enters the HPA 228. Thus, with respect to the example above, if the +1 dB change in offset power is insufficient, then additional "above" error reports will result in further power increases until the error count is sufficiently low. Thereafter, the error report will tend to alternate between "above" and "not above," thereby keeping the chanslot error level virtually constant, at the preferred error threshold level.

The foregoing disclosure refers to transmitting and receiving data signals in general. In the preferred embodiment, these data signals are in the form of asynchronous transfer mode (ATM) cells. Thus, in the preferred embodiment, the error reports are in the form of error report cells. FIG. 3 illustrates the structure of an error report cell 300 according to a preferred embodiment of the present invention. An ATM cell typically has 53 bytes wherein 5 bytes make up the header of the cell ("cell header") and 48 bytes make up the body of the cell ("cell body"). Like a typical ATM cell, an error report cell 300 generally includes a 5-byte cell header 301 and a 48-byte cell body 302. The cell body 302 generally further comprises a 4-byte subheader 303 and a 44-byte report field 303.

The primary function of the cell header 301 is to carry the address of the cell 300. The cell header 301 typically includes two individual fields known as the Virtual Path Indicator (VPI) and the Virtual Channel Indicator (VCI), which jointly serve as the "addressing field." The VPI and VCI are addressed to all UETs located within the beam. Each UET is required to monitor all cells that arrive in its downlink. When error report cells 300 are received by the UETs within the beam, the error report cells 300 are passed to each UET's error report processor (210 of FIG. 2) for parsing as explained above.

As briefly mentioned above, each error report cell corresponds to a particular set of uplink time slots in a particular uplink frame in which the related signal was transmitted. The subheader 303 of the report cell 300 contains fields to specify the uplink frame number and time slot number to which the report cell refers.

The 44-byte report field 304 for each error report cell 300 consists of a total of 176 dibits (2 bits per dibit, four dibits per byte) in the 44 byte report field 304. Generally, each dibit contains the error information (i.e., the 1-bit "above/not above" indicators) for two chanslots of the current frame. In the example case discussed above in which the uplink signal is divided into 175 channels and the frame is divided into 52 time slots, each dibit in the error report field 304 of an error report cell may correspond to one frequency channel, and each error report cell may contain the error indicators pertaining to two time slots of the current frame, over all 175 frequency channels. In this case the $176^{th}$ dibit of the report field 304 may not be used. The first bit 308 of a dibit 305 may contain the error indicator pertaining to a first time slot S1 of the current frame, and the second bit 309 of a dibit 305 may contain the error indicator pertaining to a second time slot S2 of the current frame. For this example, 26 ATM error report cells would be required for transmission of the error indicators pertaining to all 9100 chanslots of the current frame.

Each UET knows the chanslots that it is allocated for transmission of data signals, as well as the frames in which it has transmitted data. Thus, the UET can easily identify the particular report cells 300 on any given downlink which contain relevant error information, and the UET may also readily locate the bit that is associated with a particular chanslot used by the UET.

Figure 4:
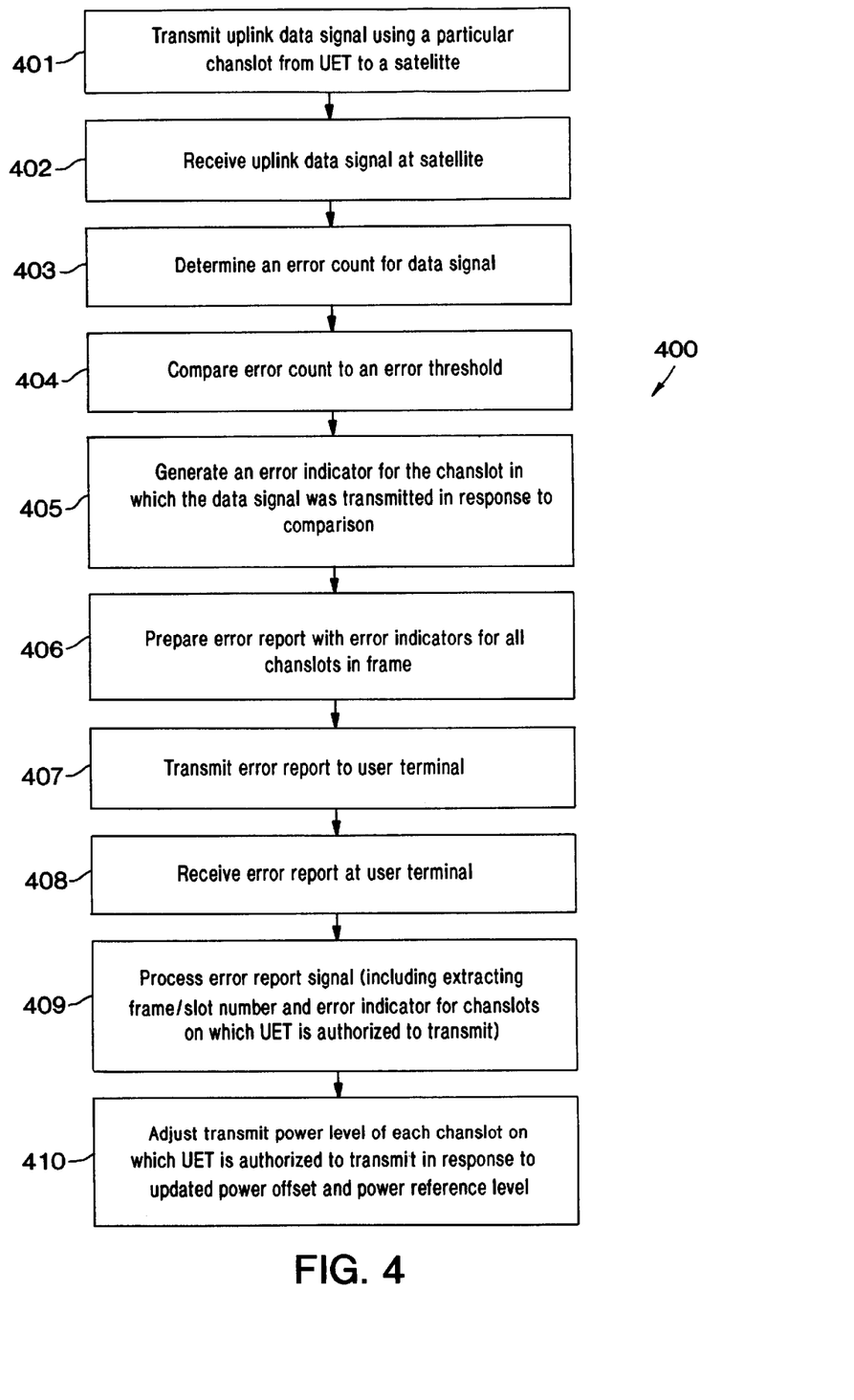
FIG. 4 is a flow chart illustrating the error-leveling method according to a preferred embodiment of the present invention.

FIG. 4 is a flow chart illustrating the error-leveling method 400 of a preferred embodiment of the present invention. As explained above, the first step 401 is for the UET to transmit an uplink data signal using a particular chanslot from the UET to a satellite. As explained above, this is generally done by a conventional uplink transmitter and uplink transmit antenna. Furthermore, before any error-leveling adjustments have taken place, the uplink data signal is generally transmitted at a transmit power level equal to the reference power level. This reference power level is generally determined by the method and system described in the copending application entitled, "Method And System For Controlling Uplink Power In A Satellite Communication System Using Power Leveling," Ser. No. 09/596,671, filed on Jun. 19, 2000. The next step 402 is for the satellite to receive the uplink data signal. This is generally accomplished by use of a standard uplink receiver and uplink receive antenna.

Next, the number of errors in the received data signal (generally referred to as the error count of the signal) is determined, and those errors are corrected (step 403). This is done by an error-correcting decoder such as, for example, a Reed-Solomon decoder. This error count is then compared to a predetermined threshold (step 404), and based on this comparison, an error indicator is generated (step 405) corresponding to the chanslot in which the received data signal was transmitted. As explained above, in one embodiment of the present invention, the error indicator is a one-bit indicator such that if, for example, the error count is greater than the error threshold ("above"), then the error indicator is equal to 1, and if the error count is less than or equal to the error threshold ("not above"), then the error indicator is equal to 0.

The error indicator for the present chanslot may then be combined with several other error indicators corresponding to other chanslots in the same frame, into an error report (step 406). This error report is then transmitted in a downlink to, and received by, all UETs in the cell coverage area to which the downlink is directed (steps 407 and 408). The error report is then processed (step 409) by the receiving UETs. As explained above, this processing step includes extracting the uplink frame number and time slot number to which the received error report pertains to determine if the UET transmitted a data signal in this frame/slot number. If the terminal did transmit in the subject frame/slot number indicated in the received error report, then the processing step further includes extracting the particular "above/not above" indicator bits from the received error report that are associated with the chanslot on which the particular UET transmitted an uplink data signal.

The next step 410 is adjusting the transmit power level of each chanslot on which the UET is authorized to transmit. As explained above, the transmit power level of a chanslot is adjusted based on an updated power offset corresponding to that chanslot, and a reference power level. The updated power offset is determined based on the error indicator for the chanslot and on the power offset for the previous data signal sent by the UET using this chanslot (generally this is zero if no prior uplink data signals have been sent on this chanslot during the current data transmission). Once the transmit power level is adjusted, the next data signal to be transmitted by the UET at the particular chanslot during the current data transmission is sent at this appropriate transmit power level, and the error loop described above with respect to FIG. 4 is repeated.

Related subject matter is further described in the following co-pending applications, all of which are assigned to the assignee of the present application, and all of which are incorporated herein by reference: Ser. No. 09/596,671 entitled "Method And System For Controlling Uplink Power In A Satellite Communication System Using Power Leveling" and filed on Jun. 19, 2000; Ser. No. 09/596,811 entitled "Method and Apparatus for Controlling A Transmission Power Threshold of a Satellite Communication System" and filed on Jun. 19, 2000; and Ser. No. 09/596,683 entitled "Comprehensive Method And System For Controlling Uplink Power In A Satellite Communication System" and filed on Jun. 19, 2000.

While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications and incorporate those features which come within the spirit and scope of the invention.

What is claimed is:

1. A method for controlling a transmit power level of a plurality of chanslots used by at least one user terminal in a satellite communication system, said method comprising the steps of:

comparing a predetermined error threshold to a number of errors in a data signal in a plurality of chanslots received at a satellite from at least one user terminal;

generating a plurality of error indicators, each error indicator corresponding to a related chanslot in use by a corresponding user terminal, wherein each of said error indicators is generated in response to said comparison; and independently controlling a transmit power level of each of said chanslots at said corresponding user terminals in response to said corresponding error indicators.

2. A method for controlling a transmit power level of a plurality of chanslots used by a user terminal in a satellite communication system, said method comprising the steps of:

comparing a predetermined error threshold to a number of errors in a data signal in a plurality of chanslots received at a satellite from a user terminal;

generating a plurality of error indicators, each error indicator corresponding to a related chanslot in use by said user terminal, wherein each of said error indicators is generated in response to said comparison; and independently controlling a transmit power level of each of said chanslots at said user terminal in response to said corresponding error indicators.

3. A method for controlling a transmit power level of a chanslot assigned to a user terminal in a satellite communication system, said method comprising the steps of:

performing an error count of a data signal transmitted from a user term to a satellite in a chanslot;

generating an error indicator in response to a comparison of a predetermined error threshold to said error count;

preparing an error report at said satellite in response to said error indicator, wherein said error report includes a plurality of error indicators, wherein each error indicator corresponds to a different chanslot;

transmitting said error report including said error indicator to said user terminal;

parsing said error report at said user terminal to extract said error indicator; and controlling a transmit power level of said chanslot at said user terminal in response to said error indicator.

4. The method of claim 3 wherein said preparing step comprises the step of preparing said error report corresponding to a frame number and a slot number of said satellite communication system, in response to said error indicator.

5. The method of claim 3 wherein said error report is in the form of at least one Asynchronous Transfer Mode (ATM) cell.

6. The method of claim 3 wherein said parsing step comprises the steps of:

determining said frame number and said slot number to which said error report corresponds;

determining whether said chanslot is in said frame number and said slot number; and controlling said transmit power level of said chanslot at said user terminal in response to said error indicator if said chanslot is in said frame number and said slot number.

7. The method of claim 6 wherein said controlling step further comprises the step of increasing or decreasing said transmit power level of said chanslot in response to said error indicator.

8. A method for controlling a transmit power level of a chanslot assigned to a user terminal in a satellite communication system, said method comprising the steps of:

performing an error count of a data signal transmitted from a user terminal to a satellite in a chanslot;

generating an error indicator in response to a comparison of a predetermined error threshold to said error count;

transmitting the error indicator to said user terminal; and controlling a transmit power level of said chanslot at said user terminal in response to said error indicator, wherein said generating step comprises the step of generating a multi-bit error indicator in response to said comparison where each value of said multi-bit error indicator corresponds to one of a plurality of predetermined ranges of ratios of said error count relative to said error threshold.

9. The method of claim 8 wherein said controlling step further comprises the step of controlling the transmit power level of said chanslot in response to said multi-bit error indicator by one of a plurality of predetermined amounts, wherein each of said predetermined ranges corresponds to one of said predetermined amounts.

10. A method for controlling a transmit power level of a plurality of chanslots used by at least one user terminal in a satellite communication system, said method comprising the steps of:

comparing a predetermined error threshold to a number of errors in a data signal in a plurality of chanslots received at a satellite from at least one user terminal;

generating a plurality of error indicators, each error indicator corresponding to a related chanslot in use by a corresponding user terminal, wherein each of said error indicators is generated in response to said comparison;

preparing an error report at said satellite in response to said plurality of error indicators, wherein said error report includes said plurality of error indicators;

parsing said error report at said at least one user terminal, wherein each individual user terminal extracts said error indicators that correspond to a related chanslot in use by said individual user terminals; and independently controlling a transmit power level of each of said chanslots at said corresponding user terminals in response to said corresponding error indicators.

11. The method of claim 10 wherein said preparing step comprises the step of preparing said error report corresponding to a frame number and a slot number of said satellite communication system, in response to said error indicator signals.

12. The method of claim 11 wherein said error report is in the form of at least one Asynchronous Transfer Mode (ATM) cell.

13. A method for controlling a transmit power level of a chanslot assigned to a user terminal in a satellite communication system, said method comprising the step of:
- transmitting an uplink data signal using a channel from a user terminal to a satellite;
- receiving said data signal in said chanslot at said satellite;
- determining an error count for said uplink data signal in said chanslot using said data signal received from said user terminal;
- comparing said error count to a predetermined error threshold;
- generating an error indicator for said chanslot in response to said comparing step;
- transmitting said error indicator to said user terminal;
- receiving said error indicator at said user terminal; and
- controlling said transmit power level of said chanslot in response to said error indicator,
- wherein said generating step comprises the step of generating a multi-bit error indicator in response to said comparing step where each value of said multi-bit error indicator corresponds to one of a plurality of predetermined ranges of ratios of said error count relative to said error threshold.

14. The method of claim 13 wherein said controlling step further comprises the step of controlling the transmit power level of said chanslot in response to said multi-bit error indicator by one of a plurality of predetermined amounts, wherein each of said predetermined ranges corresponds to one of said predetermined amounts.

15. A method for controlling a transmit power level of a chanslot assigned to a user terminal in a satellite communication system, said method comprising the step of:
- transmitting an uplink data signal using a channel from a user terminal to a satellite;
- receiving said data signal in said chanslot at said satellite;
- determining an error count for said uplink data signal in said chanslot using said data signal received from said user terminal;
- comparing said error count to a predetermined error threshold;
- generating an error indicator for said chanslot in response to said comparing step;
- preparing an error report at said satellite in response to said error indicator, wherein said error report includes a plurality of error indicators, wherein each error indicator corresponds to a different chanslot;
- transmitting said error report including said error indicator to said user terminal;
- receiving said error indicator at said user terminal;
- parsing said error report at said user terminal to extract said error indicator; and
- controlling said transmit power level of said chanslot in response to said error indicator.

16. The method of claim 15 wherein said preparing step comprises the step of preparing said error report corresponding to a frame number and a slot number of said satellite communication system, in response to said error indicator signal.

17. The method of claim 16 wherein said error report is in the form of an Asynchronous Transfer Mode (ATM) cell.

18. The method of claim 17 wherein said parsing step comprises the steps of:
- determining said frame number and said slot number to which said error report corresponds;
- determining whether said chanslot relates to said frame number and said slot number; and
- controlling said transmit power level of said chanslot at said user terminal in response to said error indicator if said chanslot relates to said frame number and said slot number.

19. The method of claim 18 wherein said controlling step further comprises the step of increasing or decreasing said transmit power level of said chanslot in response to said error indicator.

20. A satellite communication system comprising:
- a communication satellite including:
  - an error detector for determining the error count in a received data signal transmitted from a user terminal to said communication satellite using a chanslot;
  - a comparator for generating an error indicator in response to a comparison of said error count to a predetermined error threshold;
  - error report circuit for preparing an error report at said satellite in response to said error indicator, wherein said error report includes a plurality of error indicators, wherein each error indicator corresponds to a different chanslot; and
  - a transmitter for transmitting said error report including said error indicator to a user terminal; and
- a user terminal including:
  - a receiver for receiving said error indicator from said comparator; and
  - a power profile processor for controlling a transmit power level of said chanslot in response to said error indicator.

21. The satellite communication system of claim 20 further comprising an error report processor for parsing said error report at said user terminal to extract said error indicator.

22. A user terminal for use in a satellite communication system comprising:
- a receiver for receiving an error indicator for a chanslot from a communication satellite, said error indicator determined by comparing a predetermined error threshold to an error count in a received data signal transmitted from said user terminal to said communication satellite using said chanslot;
- an error report processor for parsing an error report received by said user terminal to extract said error indicator from said error report, wherein said error report includes a plurality of error indicators, wherein each error indicator corresponds to a different chanslot; and
- a power profile processor for controlling a transmit power level of said chanslot of said user terminal in response to said error indicator.

23. A satellite for use in a satellite communication system comprising:
- an error detector for determining the error count in a received data signal transmitted from a user terminal to said satellite using a chanslot;
- a comparator for generating an error indicator in response to a comparison of said error count to a predetermined error threshold, said error indicator to be used by said user terminal for controlling a transmit power level of said chanslot assigned to said user terminal in response to said error indicator; and
- an error report circuit for preparing an error report at said satellite in response to said error indicator, wherein said error report includes a plurality of error indicators, wherein each error indicator corresponds to a different chanslot.

* * * * *